United States Patent

[11] 3,582,743

[72] Inventors Guillermo Diaz;
Robert E. Wood, both of Ann Arbor;
Samuel N. Irwin, Detroit, Ala.

[21] Appl. No. 806,932
[22] Filed Mar. 13, 1969
[45] Patented June 1, 1971
[73] Assignee Sycor Inc.
Ann Arbor, Mich.

[54] SPEED CONTROL SYSTEM FOR TAPE RECORDER APPARATUS
7 Claims, 6 Drawing Figs.

[52] U.S. Cl. .... 318/308, 318/328, 179/100.1, 242/75.51
[51] Int. Cl. .... G11b 15/32
[50] Field of Search .... 318/6, 317, 318, 328; 242/75.5, 75.51; 179/100.1

[56] References Cited

UNITED STATES PATENTS

| | | | |
|---|---|---|---|
| 2,777,964 | 1/1957 | DiMino | 242/75.51X |
| 3,215,918 | 11/1965 | Lichowsky | 318/328X |
| 3,324,320 | 6/1967 | Evert | 242/75.51X |

*Primary Examiner*—Oris L. Rader
*Assistant Examiner*—Robert J. Hickey
*Attorney*—Price, Heneveld, Huizenga and Cooper

ABSTRACT: In a tape recorder/reproducer apparatus, particularly where a low-inertia highly-responsive drive train is used, tape speed control means including a variable-speed motor for the drive train energized through a closed-loop servosystem in which the actual output speed of the motor is monitored by a sensor and compared to a reference, to closely control the motor speed in accordance with the reference. The reference is provided by a freely-supported capstan which senses actual tape speed at the tape head and produces an output which is compared to a predetermined reference representative of the desired tape speed, such that the motor is servocontrolled to satisfy a predetermined tape speed function.

INVENTORS
GUILLERMO DIAZ
ROBERT E. WOOD
SAMUEL N. IRWIN
BY Price, Heneveld, Huizenga & Cooper
ATTORNEYS INVENTORS
GUILLERMO DIAZ
ROBERT E. WOOD
SAMUEL N. IRWIN
BY Price, Heneveld
Huizenga & Cooper
ATTORNEYS

SPEED CONTROL SYSTEM FOR TAPE RECORDER APPARATUS

BACKGROUND

The present invention relates to tape recorder/reproducer devices, and more particularly to a novel drive and speed-control system for use in such apparatus. More particularly still, the invention relates to such a system in which the recording tape is moved past the tape head by driving the takeup reel for the tape, and in which the tape speed past the head is monitored to control the speed of the takeup reel drive, to thereby maintain the speed of the tape past the head at a constant, or other predetermined linear velocity.

In recent times, the concept has been advanced of using in data entry and data processing applications the popular cassette-type recording tape magazines which are presently used primarily in audio equipment. In this application, a drive means can be used to move the tape enclosed within the cassette magazine past the tape head by rotation of the cassette takeup winding spool or reel, as opposed to the conventional technique of driving the tape past the tape head by use of a capstan and pinch roller, and rotating the takeup reel strictly as a followup measure to wind the tape already moved past the head onto the takeup reel.

Data entry and data processing applications demand very precise control of tape movement past the head in recording and reproducing modes, and also require a highly responsive drive train which can be stopped and reversed practically instantaneously, thereby precluding the use of high-inertia flywheel-type drives conventionally found in systems which actually move the tape past the head by a capstan or the like. Although it is entirely true that the tape drive in data-handling equipment must be quickly responsive and should therefore have low physical masses and inertia, it is equally true that the tape must be moved past the head at an exceedingly uniform, regular and carefully-controlled speed; consequently, the drive system should include a counterpart of physical inertia which will provide the required uniformity of tape movement and eliminate the ever-present drive train pulsations and eccentricities produced by such factors as electrical motors having finite numbers of poles, as well as the presence of drive components such as rubber or resilient wheel-to-wheel or wheel-to-shaft engagements, and/or drive teeth engagements having a certain amount of resiliency or bending strain under load, and the like.

The foregoing factors and requirements thus establish the need in such a recorder device not only for a drive train which is quickly responsive, but also for a control system for such a drive train which will operate it with the desired uniformity, as by eliminating or compensating for the inherent eccentricities and nonuniformities in the output of the physical components of the drive train, to thereby in effect simulate drive train inertia, and also for carefully controlling the speed at which the tape is moved past the tape head. This is particularly so in recorder devices using cassette and other types of tape magazines and in which the tape is driven past the head by rotating the takeup spool or reel within the magazine, inasmuch as the effective winding diameter of the takeup reel varies extensively from the initial point, at which the reel may be substantially empty, to the final point, where the reel is substantially filled. Thus, if the takeup reel were to be driven at a constant angular rate, the actual linear tape speed past the tape head would vary over a considerable range, and this would be extremely detrimental to the "reading" and "-writing" of digital or other data upon the recording tape. Consequently, the requirement and the need apprehended by the present invention is for a tape drive control system which will rotate the takeup reel at variable and controlled speeds providing an effectively uniform tape movement past the tape head.

SUMMARY OF INVENTION

The present invention provides a tape drive control system which satisfies the requirements set forth above, and which will control a drive train rotating the takeup reel of a tape recorder/reproducer apparatus, including an apparatus of this type which uses cassette-type tape magazines, at varying and carefully-controlled speeds, such that the linear speed of the tape past the tape head is a uniform and constant one.

Briefly stated, the system of the invention provides a variable-speed motor for the drive train, and automatically initiates changes in the output speed of such motor to regulate the speed of the tape past the head. This system includes means for sensing the speed of the motor output itself, and for energizing the motor in a closed-loop system which controls tape speed at a predetermined nominal rate and which automatically compensates for any fluctuations or variations in the nominal speed. In so doing, the actual linear speed of the tape is monitored and used as a reference in the closed-loop system. Also, the invention provides a novel free capstan member for engaging the tape in proximity to the tape head, to be rotated by the moving tape and to provide a sensing of the actual tape speed in this area.

IN THE DRAWINGS

PREFERRED EMBODIMENT

Figure 1:
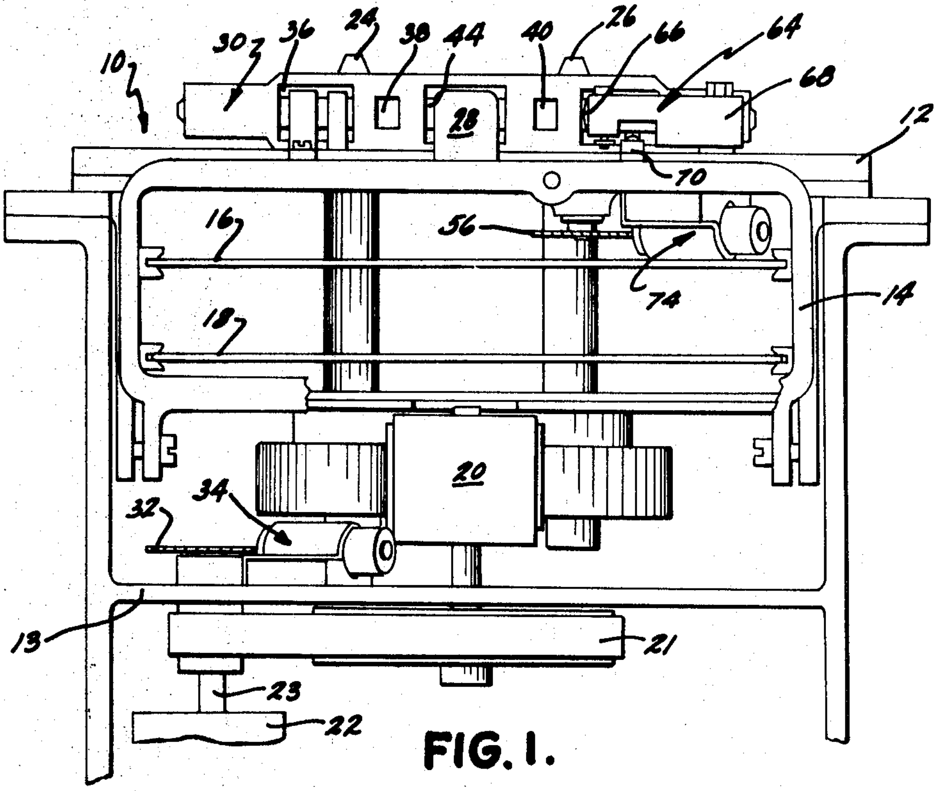
FIG. 1 is a fragmentary end elevation of tape recorder/reproducer apparatus having a mounted cassette magazine and including the sensing and other elements of the speed control system.

Referring now in more detail to the drawings, a preferred recorder/reproducer apparatus 10 is illustrated in FIG. 1, including basically a frame or housing means 12 which pivotally mounts an elongated, generally rectangular head arm 14. The frame 12 also supports a pair of internal circuit boards 16 and 18, as well as a drive means 20 including a variable-speed motor 22 which, through appropriate rotary drive elements will rotate one or the other of a pair of upstanding drive spindles 24 and 26. As illustrated, the spindles extend upwardly from the top of the frame 12, and these members pass through the exposed interior of a pair of spaced tape-winding spools or reels (not specifically shown) mounted in a cassette-type tape magazine 30 which seats atop the frame means.

The variable-speed motor 22 powering the drive means for the recorder/reproducer apparatus and ultimately rotating one or the other of the drive spindles 24, 26 to effect movement of the recording tape within the cassette has an upstanding output drive shaft 23 (FIG. 1), which may be journaled in an appropriate bearing aperture in a transverse shelflike portion 13 of the frame means 12, as illustrated. For drive purposes, rotary motion of the output shaft 23 is preferably coupled to the spindles by a flat drive belt 21 which turns a wheel mounted on a rotary shaft **21*a*, the latter driving hubs 24*a* or 26*a* attached to respective spindles 24 and 26 through desired idler rollers disposed therebetween. The extreme upper end of the motor output shaft 23 carries a sharply-toothed wheel or gear means 32, which is rotated in unison with the shaft. Gear 32** comprises a sending unit or actuator for a magnetic sensor 34, which also may be physically mounted on the aforementioned shelflike portion 13 of the frame 12. Basically, the sensor 34, and the gear 32 which cooperates therewith, are known elements of a rotary motion transducer used commercially in numerous applications, the specific details of whose operation and structure will be familiar to those skilled in the art. In essence, the sensor 34 creates a magnetic field which is altered by the passage of the teeth on gear 32, which are disposed in close proximity to the sensor. This provides an output pulse from the sensor in the form of a sinusoidal wave created by the passage of each successive tooth on the wheel or gear 32. In this manner, the actual performance of the motor 22 is continuously and closely monitored, with the sinusoidally-varying signal produced by sensor 34 being coupled to a control circuit, illustrated schematically in FIG. 6 and described hereinafter.

Conventional tape cassette magazines such as that designated by the numeral 30 in FIG. 1 include windowlike openings such as those designated 36, 38, 40, and 42 located in the front facing or side of the cassette 30. These provide access to the magnetic tape 44 enclosed within the cassette for the tape head 28 and tape guides or the like mounted on the pivotal head arm 14, or other comparable member, so that the tape head and such guides may be pivoted into engagement with the enclosed tape. Also, cassettes conventionally have at least four openings in both the top wall and the bottom wall thereof, immediately behind the position occupied by the tape as it moves past the front face of the cassette. These openings are disposed in vertically aligned pairs, and they are conventionally provided for two purposes: firstly, two of them receive suitable guide posts or anchors for the front part of the cassette when it is in place upon the recorder; secondly, one such opening receives an upstanding capstan by which the tape is conventionally driven (i.e., pulled) past the tape head 28. Normally, only a single such drive capstan is used, and therefore only a single one of the two possible capstan-receiving pairs of vertically aligned apertures is in use at any one time, the other such pair of apertures coming into play when the cassette is inverted for recording or reproducing functions on the opposite half of the magnetic tape.

Figure 2:
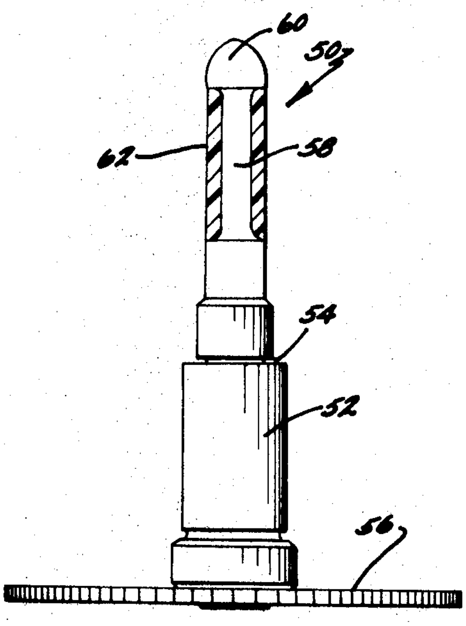
FIG. 2 is an enlarged side elevation of the free capstan used in the system, with the tape-engagement portions broken away to show structural details.
Figure 3:
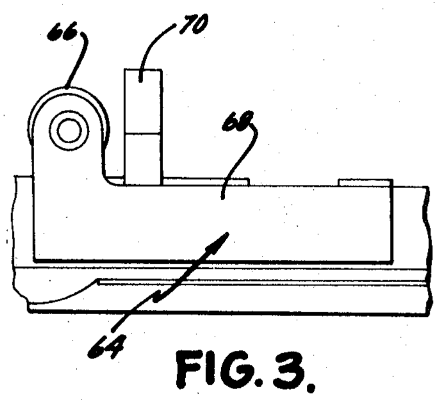
FIG. 3 is a fragmentary overhead plan view of part of the recorder apparatus, showing details of the pinch roller used with the free capstan.
Figure 4:
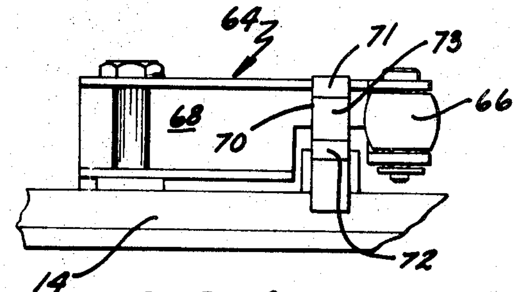
FIG. 4 is an enlarged, fragmentary side elevation showing further details of the pinch roller assembly.
Figure 5:
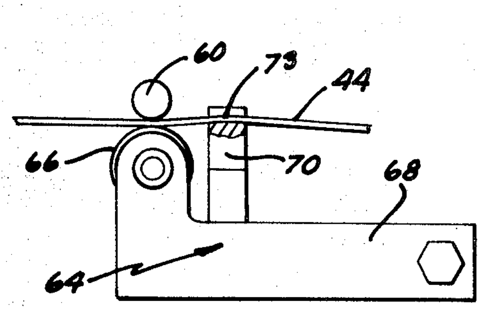
FIG. 5 is a fragmentary, enlarged overhead plan view showing the recording tape engaged between the pinch roller and the free capstan.

In accordance with the present invention, the tape within the cassette is driven by rotating the cassette takeup spool or reel, and no drive capstan whatever is employed. Consequently, the apertures in the cassette case conventionally provided for receiving a drive capstan may be put to other uses; more specifically, in accordance with the invention one such aperture in a pair of the same is used to receive an upstanding freely-supported capstan member 50 (FIGS. 1, 2 and 5). As best illustrated in FIG. 2, the capstan member 50 is an elongated, generally cylindrical member having a cylindrical journal portion 52 near its lowermost extremity which is received within an appropriate cylindrical bearing passage formed within the frame means 12 in vertical orientation. Immediately above the journal portion 52 is an undercut 54 for receiving an appropriate U-shaped keeper or the like, by which the capstan is held in place in a freely-rotatable mounting within its aforementioned bearing passage in the frame. At its lower extremity, the capstan 50 has a sharply-toothed gear wheel 56 attached to it, generally comparable to the aforementioned similar gear wheel 32 attached to the output shaft of the motor 22. The upper portion of the capstan protrudes upwardly into the interior of the cassette 30 when the latter is seated in place atop the recorder, entering the cassette through one of the openings in its horizontal walls, as mentioned previously.

Near the top of the capstan is a shank portion 58 which is of reduced diameter, above which the end extremity of the capstan has a bulletlike tapered nose 60 provided for the purpose of smoothly guiding the tape within the cassette as the latter is seated downwardly over the capstan. About the shank portion 58, the capstan carries a tubular layer or sleeve 62 of slightly resilient material having an increased coefficient of friction with respect to the remainder of the capstan, which is of metal. For example, the sleeve 62 may be of a generally rigid polyurethane or other similar synthetic "plastic" material, and it is preferably molded in place upon the capstan so as to tightly encircle the reduced shank 58 and be nonrotatably attached to the same. This tubular sleevelike portion is positioned along the length of the capstan such that when the cassette 30 is in place, as illustrated, that portion of the tape 44 enclosed within the cassette which extends lengthwise across the tape head 28 will be in direct tangential alignment with, and in contact with, the surface of the sleeve 62. In this relationship, the tape 44 is in driving engagement with the capstan 50, by its sleeve 62, which as stated is of increased frictional material. It is desired that the tape, driven by rotation of its takeup spool or reel, will rotate the capstan at whatever speed the tape is moved past it, with no slippage desired between the tape and the capstan.

In order to assure the absence of slippage between the capstan and the recording tape within the cassette, a pinch roller assembly 64 (FIGS. 1, 3, 4, and 5) is provided, by which the recording tape is continually biased against the sleeve portion 62 of the capstan. As illustrated, the pinch roller assembly 64 comprises a roller element 66 rotatably carried by a somewhat elongated L-shaped arm 68. This arm is pivotally mounted near one of its end extremities atop the pivotal head arm 14 mentioned hereinabove, such that the roller 66, located at the opposite end of the arm, may enter the inside of the cassette 30 through its frontal window of aperture 42, to thereby contact the recording tape 44 and push it against the capstan disposed on the opposite side of the tape. In this connection, it is to be noted that the mounting arm 68 for the pinch roller should be spring-biased, as by a torsion spring (not specifically shown in the drawings) toward the cassette and its window 42.

The tubular sleevelike portion 62 of the capstan is, as stated previously, preferably at least slightly resilient, whereas the pinch roller 66 is preferably substantially nonresilient, and also is preferably of a material having a lubricous surface characteristic, such as for example the hard synthetic polymer sold commercially under the trademark "Teflon." Such a construction is advantageous for several reasons, including the positive manner in which it pushes the recording tape against the frictional sleeve 62 of the capstan, as well as the fact that the lubricous surface characteristic of the pinch roller substantially reduces friction between the tape and itself.

It should be noted that a stationary or fixed tape guide member 70 is provided immediately adjacent the roller element 66 of the pinch roller. Like the pinch roller assembly, tape guide 70 is mounted atop the head arm 14 which, when pivoted toward the mounted cassette 30, brings the tape guide and the roller element into contact with the recording tape within the cassette, in the manner illustrated in FIG. 4. As illustrated (FIGS. 4 and 5) the inner end of tape guide 70 (i.e., that facing the cassette) has a rectangular C-shaped configuration, with a recessed medial portion 73 flanked by vertically-spaced protrusions 71 and 72 which support the tape vertically and maintain it at the appropriate level for contact with the pinch roller and capstan. Preferably, the medial portion 73 of the tape guide is rounded at least slightly to form in effect a segment of a vertical cylinder. This causes a corresponding bending of the tape passing over this portion of the guide to rigidify it vertically at this point and help contain it between the upper and lower guide projections 71 and 72. Also, the medial portion 73 of the tape guide is located somewhat forwardly of the surface of the pinch roller 66 (FIG. 5) with respect to the cassette and its enclosed tape, so that in the tape-engaging position of the guide and pinch roller, the guide forces the tape inwardly and against the capstan 60, causing the tape to contact the capstan on an area thereof which is greater than the mere line-contact to be expected of a purely tangential engagement; i.e., the guide causes a slight but significant "wrapping" effect of the tape on the surface of the capstan. This increases the frictional engagement between the tape and the capstan and helps to eliminate slippage effects therebetween.

In operation, as the magnetic tape 44 within the cassette 30 is driven from one of the internal winding spools or reels to the other past the tape head 28, the capstan 50 is rotated in unison with the moving tape. This also rotates the sharply-toothed gear wheel 56 at the lower end of the capstan in angular unison with the tape. Gear 56 at the bottom of the capstan modulates the magnetic field of a second sensor means 74 (FIG. 1), which is of the same basic type as the sensor 34 mentioned hereinabove. This produces a sinusoidally-varying electrical signal whose frequency is proportional to the speed of the capstan member, and consequently also proportional to the actual speed of the tape in the very area where the tape head 28 is located; consequently, the output from sensor 74 will be proportional to the linear speed of the tape 44 as it moves past the tape head.

Figure 6:
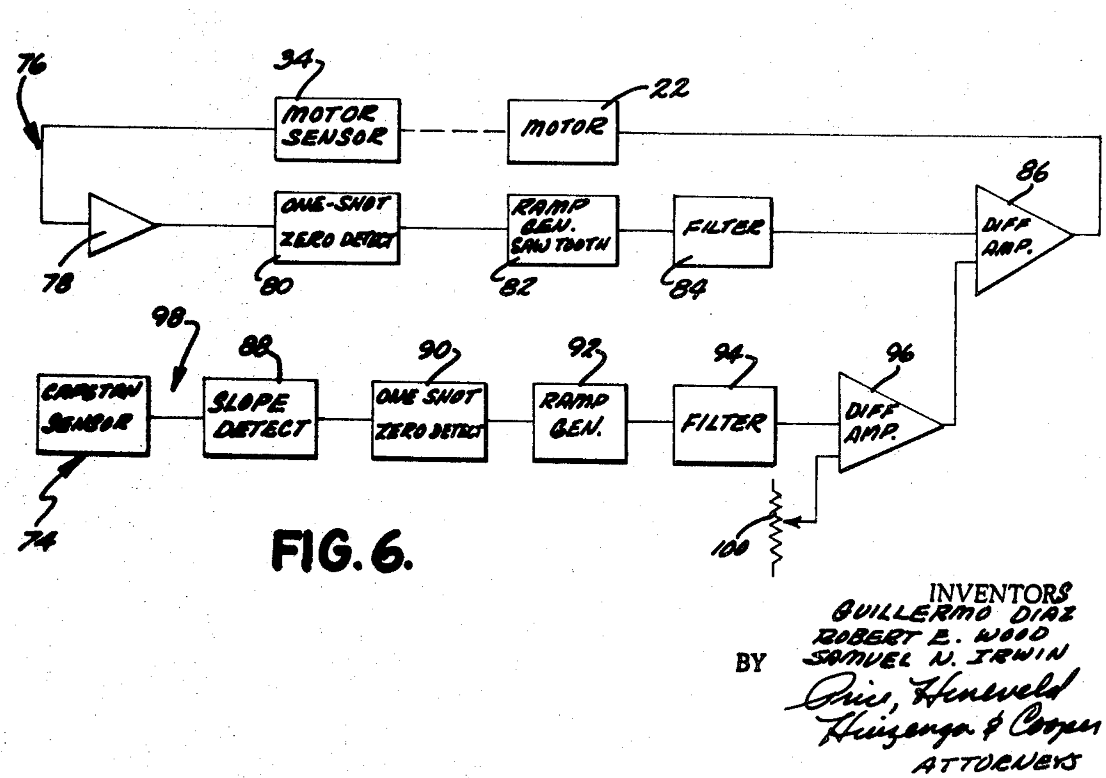
FIG. 6 is a schematic circuit diagram in block form showing the elements of the speed control loop.

The manner in which the components of the present system are interconnected, and the manner in which they operate as a system, may be seen in FIG. 6. Firstly, the variable-speed motor 22 is driven in a closed-loop servosystem 76. This loop includes the motor itself, the sensor means 34 mentioned previously, and speed-control circuitry including the following elements. The electrical output from the sensor means 34 is coupled to a preliminary amplifier 78, from where the essentially sinusoidal wave so produced is coupled to a one-shot, zero-detect multivibrator circuit 80, which generates a relatively sharply-defined, essentially rectangular pulse each time the sinusoidal wave from sensor 34 crosses the zero reference point. The pulses from the zero-detect multivibrator 80 are coupled to a ramp or sawtooth generator 82, which generates a sawtooth wave which increases with time each time a new pulse from the multivibrator 80 is received. The sawtooth output from the ramp generator 82 is coupled to a filter 84 which performs an averaging function on the sawtooth wave, and the resulting output is coupled to a differential amplifier 86, whose output in turn drives the motor 22.

From the foregoing circuit arrangement, it will be noted that if a constant reference is applied to the differential amplifier 86, servo loop 76 will hold the variable speed motor 22 at a substantially constant rate closely corresponding to that established by the level of such reference, depending upon the time constant of the loop, and excellent simulation of a drive system having a substantial amount of mass and physical inertia may be obtained without actually having such a physical system. Consequently, the drive uniformity to be obtained is excellent, while at the same time the massive inertia customarily encountered in capstan or other similar tape-drive systems is eliminated, and the system can be extremely responsive, providing substantially instantaneous starts, stops, and reversals.

While the foregoing aspects of the servo loop 76 are important and valuable considerations of the present drive system, the function of the capstan sensor 74 and its associated circuitry is of extreme importance. As also illustrated in FIG. 6, the capstan sensor 74 is coupled through slope-detecting circuitry 88 to a second one-shot zero-detect multivibrator 90, which in turn is coupled to a second ramp generator 92, in turn coupled to a filter 94 whose output is coupled to another differential amplifier 96. Basically, this circuitry is much like that found in loop 76 and already described, with the exception of the slope-detecting circuitry 88. The latter is preferably included as a result of the smaller size of the gear wheel 56 rotated by the capstan assembly, and the proportionately smaller teeth on such wheel, which produce a smaller and less-distinct output from the capstan sensor 74. In other respects, the capstan sensor loop 98 operates in a manner directly analogous to that of the motor sensor loop 76, and produces an output to the differential amplifier 96 which is proportional to the actual linear speed of the tape moved past the tape head. The reference for differential amplifier 96 may be provided by a potentiometer 100, such that this reference may be precisely adjusted to represent a desired uniform tape speed in the area of the recording head. Consequently, the output from differential amplifier 96 will be an error signal representative of differences between the actual speed of the tape past the tape head and a speed which is ideally desired. This error signal is applied to differential amplifier 86 in the motor sensor loop 76, as a reference which will in effect control the ultimate operation of loop 76 and vary the speed of the motor 22 so that it produces the desired tape speed. As may be appreciated, the error signal from differential amplifier 96 may be switched to differential amplifier 86 in a manner applying the capstan sensor control only when desired, and removing the latter for a different reference (such as a constant value) when the recorder is to be operated in fast-rewind, fast-forward or other modes.

Thus, in overall operation, it will be seen that the initial or nominal operation of the motor 22, and therefore the operation of the overall tape drive train and the movement of the tape itself, will be determined by the loop 76, according to which the motor output will be closely controlled about a desired speed determined by the reference input to differential amplifier 86. As stated, this can in fact consist of practically any desired function. In the recording or reproducing mode, where tape speed past the tape head must be carefully controlled, the reference input to differential amplifier 86 will be a signal which varies with time, depending upon the actual speed of the tape past the tape head. If it be assumed that all or most of the recording tape is on the "holding" or nontakeup spool within the cassette, the effective winding diameter of the takeup spool will be very small. Consequently, if a uniform tape speed is to be maintained past the tape head, the drive motor 22 must initially rotate the takeup spool within the cassette at a relatively high rate of speed, which will exponentially decrease as the tape is wound onto the takeup spool to increase its effective winding diameter.

The electrical function determining the changes in operating speed of the motor 22 is generated by sensing the tape movement itself, in relation to the reference applied to differential amplifier 96 in the capstan sensor loop 98. Initially, when the takeup reel is substantially empty, it may be anticipated that the nominal motor drive speed established by loop 76 will move the tape too slowly, and the time interval between pulses from multivibrator 90 to ramp generator 92 will therefore be large, and the filtered output from the ramp generator proportionately large. Consequently, the error signal from differential amplifier 96 to differential amplifier 86 will also be large. This will represent a high reference level to differential amplifier 86, causing its output to raise the excitation applied to motor 22 and increase its speed. Therefore, the tape speed will very quickly be brought up to the desired level, and maintained there by the influence of the capstan sensor loop 98.

As will be appreciated, the control and drive system of the present invention provides significant advantages for the purposes stated hereinabove, and in fact makes possible the utilization of low cost tape magazines of a commercially available type in the much more critical environment of data-entry and data-handling. Thus, while the system of the invention may well have numerous analogous applications, it is anticipated that its principal application will be in the data-processing application just described. It is entirely conceivable that upon examining the foregoing disclosure, those skilled in the art may devise particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration only and is in no way intended to illustrate all possible forms of the invention.

The embodiments of the invention in which we claim an exclusive property or privilege are defined as follows.

1. Tape speed control apparatus for tape recorder/reproducer apparatus of the type having a drive train for moving recording tape past a tape head at a speed proportional to that of a drive motor in said drive train, said apparatus comprising: a variable speed motor for said drive train; drive excitation means for providing an energizing signal to said motor and thereby controlling its speed; means for monitoring the speed of said motor and providing an output signal representative thereof; and control means coupled between said monitoring means and said drive excitation means to receive said output signal from the former and to control the latter in accordance therewith, such that the motor-energizing signal provided by said excitation means varies in a manner maintaining the actual speed of said motor at predetermined valued; said control means including means for generating a reference signal, which is instantaneously representative of periodically varying desired motor speeds, and further including means for producing a control signal representative of differences between said monitoring means output signal and said reference signal, said control signal being coupled to said motor drive excitation means to control the latter; said means for providing a reference signal also including means for sensing the linear speed of said recording tape past said tape head, said reference signal being representative of differences between the sensed tape speed and a desired tape speed.

2. The apparatus of claim 1, wherein said means for sensing tape speed includes a rotatable member for engaging the tape and being rotated thereby.

3. The apparatus of claim 2, wherein said rotatable member comprises a free, undriven capstan member moved only by said tape.

4. The apparatus of claim 3, wherein said capstan member has tape-engaging surface portions of a frictional material, and wherein said means for sensing tape speed further includes a pinch roller having a roller element of hard material with a lubricous surface.

5. A method of driving recording tape past the tape head of a recorder/reproducer apparatus at controlled speeds comprising the steps: rotating the takeup reel for such tape to pull the tape past the tape head; monitoring the actual linear speed of the tape as it is pulled past such head; producing control signals which are representative of differences between the monitored actual tape speed and a desired tape speed; and varying the speed at which said takeup reel is rotated in accordance with said control signals by changing the effective output of a variable-speed electric motor driving said reel to maintain the linear speed of said tape past said head at said desired speed, including the steps of energizing said motor by a closed-loop system in which the motor speed is monitored and controlled at a predetermined nominal value, and using said control signals representative of actual tape speed to vary the speed of said motor from said nominal value.

6. The method of claim 5, wherein the speed of the tape is monitored by placing a rotatable member in contact with said tape and moving the member and the tape at the same rate, and sensing the rotary movement of such member.

7. The method of claim 6, wherein said tape speed is monitored by freely supporting said member as an independent rotatable component and rotating the same by driving the tape contacting such member.